US012263568B2

(12) United States Patent
Tam et al.

(10) Patent No.: US 12,263,568 B2
(45) Date of Patent: Apr. 1, 2025

(54) HEAD VALVE SYSTEM FOR AIR SPRING POWER TOOL

(71) Applicants: Robert Bosch GmbH, Stuttgart (DE); Basso Industry Corp., Taichung (TW)

(72) Inventors: Ramon Tam, Buffalo Grove, IL (US); Peter Wierzchon, Morton Grove, IL (US); Chien-Kuo Po, Taichung (TW)

(73) Assignees: Robert Bosch Power Tools GmbH, Leinfelden-Echterdingen (DE); Basso Industry Corp., Taichung (TW)

( * ) Notice: Subject to any disclaimer, the term of this patent is extended or adjusted under 35 U.S.C. 154(b) by 187 days.

(21) Appl. No.: 17/475,560

(22) Filed: Sep. 15, 2021

(65) Prior Publication Data

US 2023/0081812 A1 Mar. 16, 2023

(51) Int. Cl.

*B25C 1/04* (2006.01)
*B25C 5/13* (2006.01)
*B25D 9/24* (2006.01)

(52) U.S. Cl.

CPC ................ *B25C 1/042* (2013.01); *B25C 5/13* (2013.01); *B25D 9/24* (2013.01); *B25D 2209/002* (2013.01); *B25D 2250/181* (2013.01); *B25D 2250/375* (2013.01)

(58) Field of Classification Search

CPC .. B25C 1/042; B25C 5/13; B25D 9/24; B25D 2209/002; B25D 2250/181; B25D 2250/375
USPC .......................................................... 227/130
See application file for complete search history.

(56) References Cited

U.S. PATENT DOCUMENTS

| | | | | |
|---|---|---|---|---|
| 4,515,303 | A * | 5/1985 | Schadlich | B25C 1/06 173/121 |
| 10,173,310 | B2 | 1/2019 | Wyler et al. | |
| 10,625,407 | B2 | 4/2020 | Sato et al. | |
| 2001/0006045 | A1* | 7/2001 | Thieleke | F02B 71/04 123/46 R |
| 2011/0198381 | A1 | 8/2011 | McCardle et al. | |
| 2019/0126452 | A1* | 5/2019 | Po | B25C 1/042 |
| 2020/0208930 | A1* | 7/2020 | Redillo | F41A 3/72 |
| 2020/0282534 | A1 | 9/2020 | Po | |

FOREIGN PATENT DOCUMENTS

| | | | |
|---|---|---|---|
| DE | 10 2005 000 107 | A1 | 3/2007 |
| EP | 3 323 557 | A1 | 5/2018 |
| WO | 2016/158130 | A1 | 10/2016 |

OTHER PUBLICATIONS https://zwick-gmbh.de/en/tri-check-check-valve/, Jan. 21, 2021, Zwick Valves (Year: 2021).*

* cited by examiner

*Primary Examiner* — Veronica Martin
(74) *Attorney, Agent, or Firm* — Maginot, Moore & Beck LLP

(57) ABSTRACT

A power tool includes an air spring cylinder. A piston is movably positioned within the cylinder. A head valve assembly of the power tool includes a flapper valve configured to seal the air spring cylinder from an air accumulator when the flapper valve is in a non-firing position.

20 Claims, 9 Drawing Sheets

FIG. 4
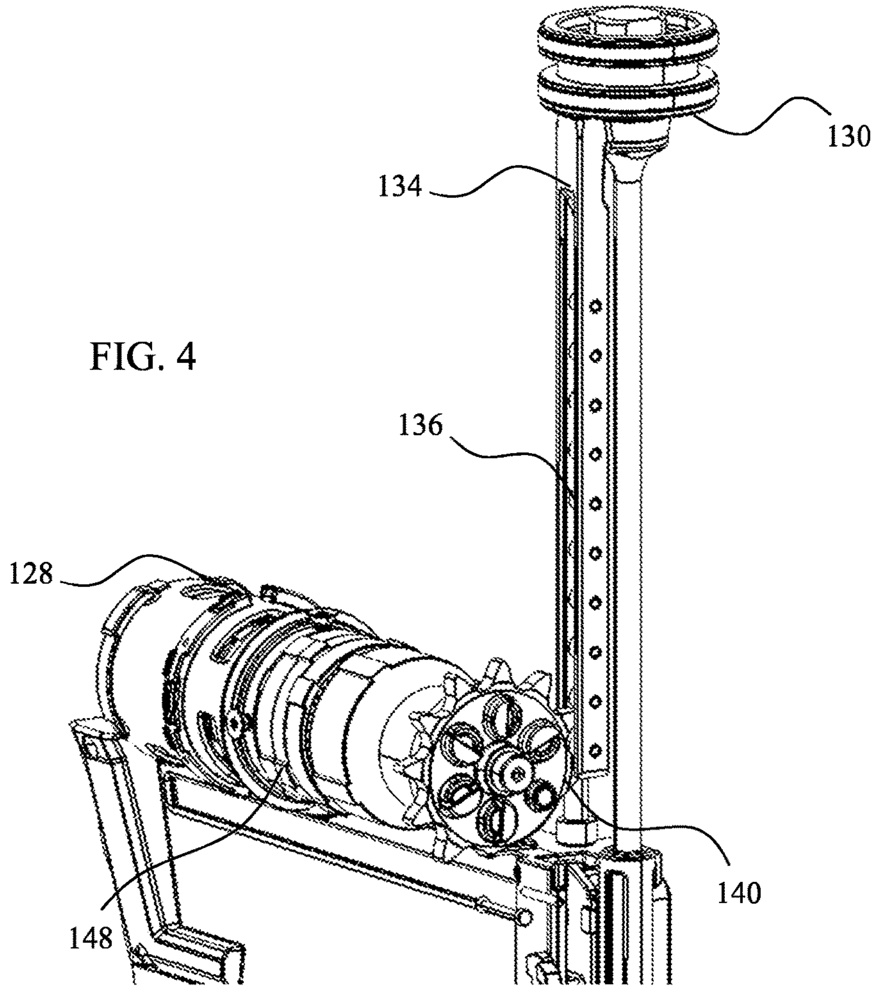
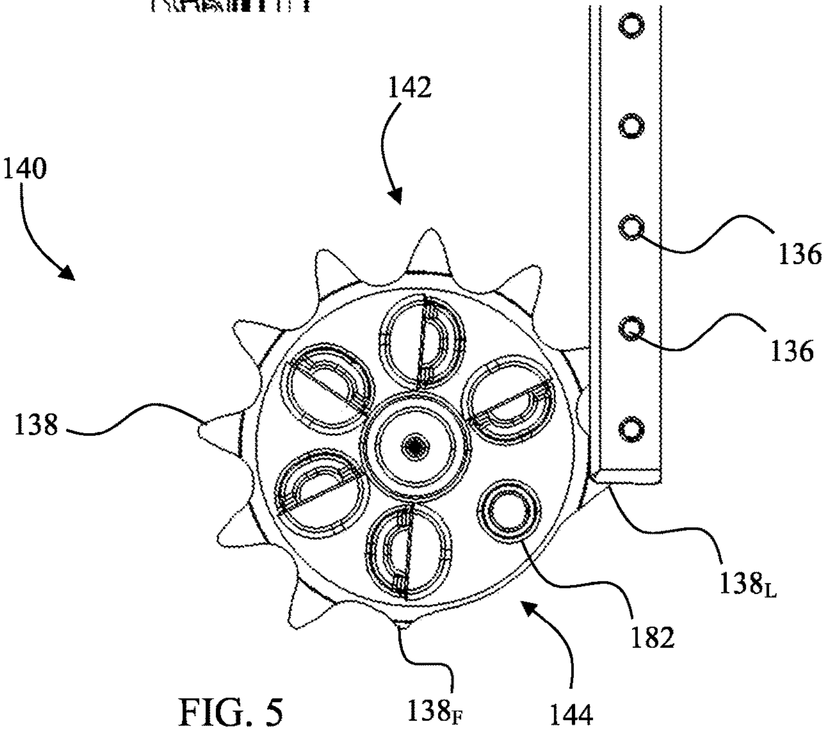
FIG. 5

HEAD VALVE SYSTEM FOR AIR SPRING POWER TOOL

FIELD

The present disclosure relates generally to a power tool, and more particularly to a power tool incorporating an air spring.

BACKGROUND

Fasteners such as nails and staples are commonly used in projects ranging from crafts to building construction. While manually driving such fasteners into a work piece is effective, a user may quickly become fatigued when involved in projects requiring a large number of fasteners and/or large fasteners to be driven into a work piece. Moreover, proper driving of larger fasteners into a work piece frequently requires more than a single impact from a manual tool.

In response to the shortcomings of manual driving tools, power-assisted devices for driving fasteners into work pieces, such as nail guns (nailers), have been developed. Contractors and homeowners commonly use such devices for driving fasteners ranging from brad nails used in small projects to common nails which are used in framing and other construction projects. Compressed air has been traditionally used to provide power for the power-assisted (pneumatic) devices. However, other power sources have also been used, such as DC motors.

While pneumatic nailers are effective, they require the use of compressed air which typically requires a compressor and compressor hose which increase the cost of the system and makes handling of the nailer cumbersome. A variety of mechanisms have been developed to replace compressors and hoses including the so-called "air spring". An air spring uses the compressibility of gas, which may be air, nitrogen, etc., (herein referred to simply as "air") to store energy which is released to forcefully move a driver which in turn forces the fastener into a workpiece.

In particular, a motor is used to force a piston to compress the air within a cylinder. A tooth of a pinion gear connected to the motor is used to maintain the piston at a ready position against the force of the compressed air. When a user presses a trigger on the nailer, the tooth of the pinion gear is moved out of engagement with a rack fixedly attached to the piston thereby releasing the piston. When the piston is released the compressed gas forces the piston to move rapidly along a working axis of the nailer. A driver attached to the piston is thus driven into a fastener thereby driving the fastener into the workpiece.

Various safety features have been incorporated into pneumatic and other power tools including power tools incorporating air springs. One such device is commonly referred to as a work contact element (WCE). A WCE is incorporated into nail gun designs to prevent unintentional firing of the nail gun. A WCE is typically a spring-loaded mechanism which protrudes forwardly of the nose portion of the nail gun from which a nail is driven. In operation, the WCE is pressed against a work piece into which a nail is to be driven. As the WCE is pressed against the work piece, the WCE compresses the spring and generates an axial movement which is transmitted to a trigger assembly via an extension member which links the WCE and the trigger assembly. The axial movement is used to reconfigure a safety device, which is typically a trigger disabling mechanism, so as to enable initiation of a firing sequence with the trigger of the nail gun.

In some power tools the mechanical safety device is replaced with an electronic system. For example, a sensor may be positioned to sense the movement or location of the WCE, and provide an output to a controller. The controller uses the output of the sensor to determine if the power tool is correctly positioned on a workpiece, and to then allow for firing of the device. Power tools incorporating air springs are typically configured in this manner.

While electronic systems are very dependable, they are susceptible to failure and even disablement. In power tools incorporating air springs, such failures/disablement can result in, e.g., firing of a nailer which is not positioned properly on a workpiece. In particular, since it is only a single tooth of a pinion gear which prevents the piston from being released, if the tooth fails or if the motor is rotated slightly, the piston is released and the piston moves along the working axis with significant force. Consequently, a nail or other fastener can be driven from the power tool with significant force thereby creating a dangerous projectile.

What is needed therefore is a system for a power tool incorporating an air spring which reduces the amount of force applied to the piston in the event the piston is inadvertently released. It would be beneficial if the system did not significantly increase the weight of the power tool or significantly alter the manner in which the power tool is operated.

SUMMARY

According to one embodiment of the present disclosure, a power tool includes an air spring cylinder and a piston located within the air spring cylinder. A head valve assembly includes a flapper valve configured to seal the air spring cylinder from an air accumulator when the flapper valve is in a non-firing position.

In one or more embodiments, the power tool includes a cap defining a headspace configured to fluidically connect the air accumulator and the air spring cylinder. The flapper valve is configured to seal the air spring cylinder from the headspace in the non-firing position.

In one or more embodiments, the head valve assembly further includes a pivot including a pivot pin received within a pivot bore of the flapper valve.

In one or more embodiments, the air spring cylinder defines a drive axis. The pivot pin has a circular cross section while the pivot bore has an oval cross section, and a major axis of the pivot bore extends along the drive axis.

In one or more embodiments, the head valve assembly includes a plunger operably coupled with the flapper valve and configured to move the flapper valve from the non-firing position to a firing position.

In one or more embodiments, the plunger is further configured to move the flapper valve from the firing position to the non-firing position.

In one or more embodiments, the air spring cylinder defines a drive axis extending upwardly and downwardly. The plunger includes a neck positioned between fingers of the flapper valve and the plunger is configured to move the flapper valve from the non-firing position to the firing position using a first shoulder portion of the plunger located beneath the fingers. The plunger in some embodiments is further configured to move the flapper valve from the firing position to the non-firing position using a head of the plunger located above the fingers. In some embodiments wherein the plunger does not include a head, a spring is used to bias the flapper valve toward the non-firing position.

In one or more embodiments, the power tool includes a work contact element (WCE) assembly including a bearing portion aligned with a shaft of the plunger. The WCE assembly is configured to move the plunger upwardly along a drive axis defined by the air spring cylinder when the power tool is pressed downwardly with the WCE assembly in contact with a workpiece.

In one or more embodiments, the WCE assembly includes a WCE spring configured to bias the WCE assembly downwardly along the drive axis. In some of these embodiments, the WCE spring has a spring constant selected to provide about 50% of a WCE actuation counter-force when the flapper valve is at the firing position. The plunger in these embodiments is configured to provide about 50% of the WCE actuation counter-force when the flapper valve is at the firing position. As used herein, a component "configured to provide about 50% of a WCE actuation counter-force" means a component that provides from 40% to 60% of the WCE actuation counter-force.

In one or more embodiments, a method of operating a power tool includes moving a flapper valve, configured to seal an air spring cylinder from an air accumulator when the flapper valve is in a non-firing position, to a firing position, disengaging a lifter gear from a rack fixedly attached to a piston positioned in the air spring cylinder, and moving the piston within an air spring cylinder upon disengagement of the lifter gear from the rack using compressed air thereby driving a fastener with a driver blade fixedly attached to the piston.

In one or more embodiments, moving the flapper valve further includes moving the flapper valve into a headspace defined by a cap, the headspace configured to fluidically connect the air accumulator and the air spring cylinder.

In one or more embodiments of the method, the flapper valve is configured to seal the air spring cylinder from the headspace in the non-firing position.

In one or more embodiments, moving the flapper valve further includes pivoting the flapper valve using a pivot including a pivot pin received within a pivot bore of the flapper valve.

In one or more embodiments of the method, the air spring cylinder defines a drive axis, the pivot pin has a circular cross section, the pivot bore has an oval cross section, and a major axis of the pivot bore extends along the drive axis.

In one or more embodiments, the method includes moving the flapper valve to the firing position using a plunger operably coupled with the flapper valve.

In one or more embodiments, the method includes moving the flapper valve from the firing position to a non-firing position using the plunger after moving the piston within the air spring cylinder.

In one or more embodiments, the air spring cylinder defines a drive axis extending upwardly and downwardly, and the plunger includes a neck positioned between fingers of the flapper valve. In these embodiments, the plunger is configured to move the flapper valve to the firing position using a first shoulder portion of the plunger located beneath the fingers, and the plunger is configured to move the flapper valve from the firing position to the non-firing position using a head of the plunger located above the fingers.

In one or more embodiments, the method includes pressing the power tool downwardly along a drive axis, defined by the air spring cylinder, while a work contact element (WCE) assembly is in contact with a workpiece, and moving the plunger upwardly along the drive axis with a bearing portion of the WCE assembly contacting a shaft of the plunger to move the flapper valve to the firing position.

In one or more embodiments, the method includes providing about 50% of a WCE actuation counter-force when the flapper valve is at the firing position with a WCE spring of the WCE assembly, the WCE spring configured to bias the WCE assembly downwardly along the drive axis. These methods further include providing about 50% of the WCE actuation counter-force when the flapper valve is at the firing position with the plunger.

BRIEF DESCRIPTION OF THE DRAWINGS

The above described features and advantages, as well as others, will become more readily apparent to those of ordinary skill in the art by reference to the following detailed description and accompanying drawings.

FIG. 4 depicts a perspective view of the rack, piston, lifter gear, planetary gearbox, and motor of the power tool of FIG. 1;

FIG. 5 depicts a front plan view of the lifter gear and a portion of the rack of the power tool of FIG. 1 with the last tooth of the lifter gear engaged with the rack;

DETAILED DESCRIPTION

Figure 1:
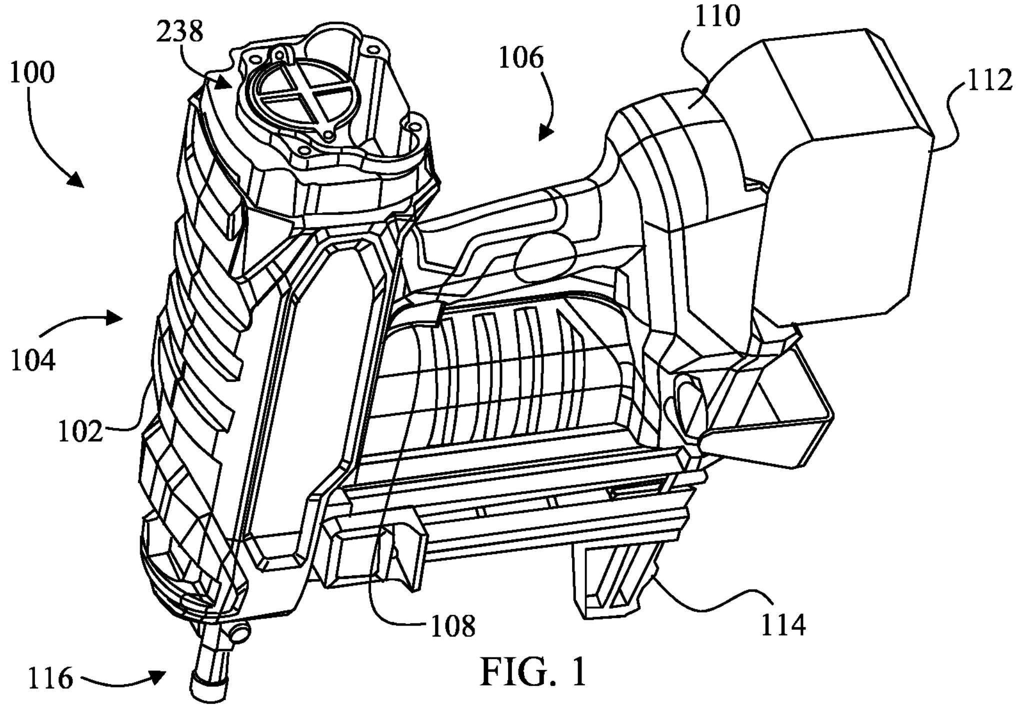
FIG. 1 depicts a perspective view of a power tool of the present disclosure with the cap removed and the housing partially removed to show a head valve assembly.

For the purpose of promoting an understanding of the principles of the disclosure, reference will now be made to the embodiments illustrated in the drawings and described in the following written description. It is to be understood that no limitation to the scope of the disclosure is thereby intended. It is further to be understood that the present disclosure includes any alterations and modifications to the illustrated embodiments and includes further applications of the principles of the disclosure as would normally occur to one skilled in the art to which this disclosure pertains.

Referring to FIG. 1, there is depicted a power tool 100 with an air spring as described below. The power tool in the embodiment of FIG. 1 is a nailer 100. The nailer 100 includes a housing 102 that defines a drive section 104 and a grip section 106. A trigger 108 is provided in the grip section 106 and a battery receptacle 110 is configured to removably couple with a battery 112 at the grip section 106. In other embodiments, the power tool is a corded tool. The nailer further includes a removable nail magazine 114. A work contact element (WCE) assembly 116 extends out of the housing 102.

Figure 2:
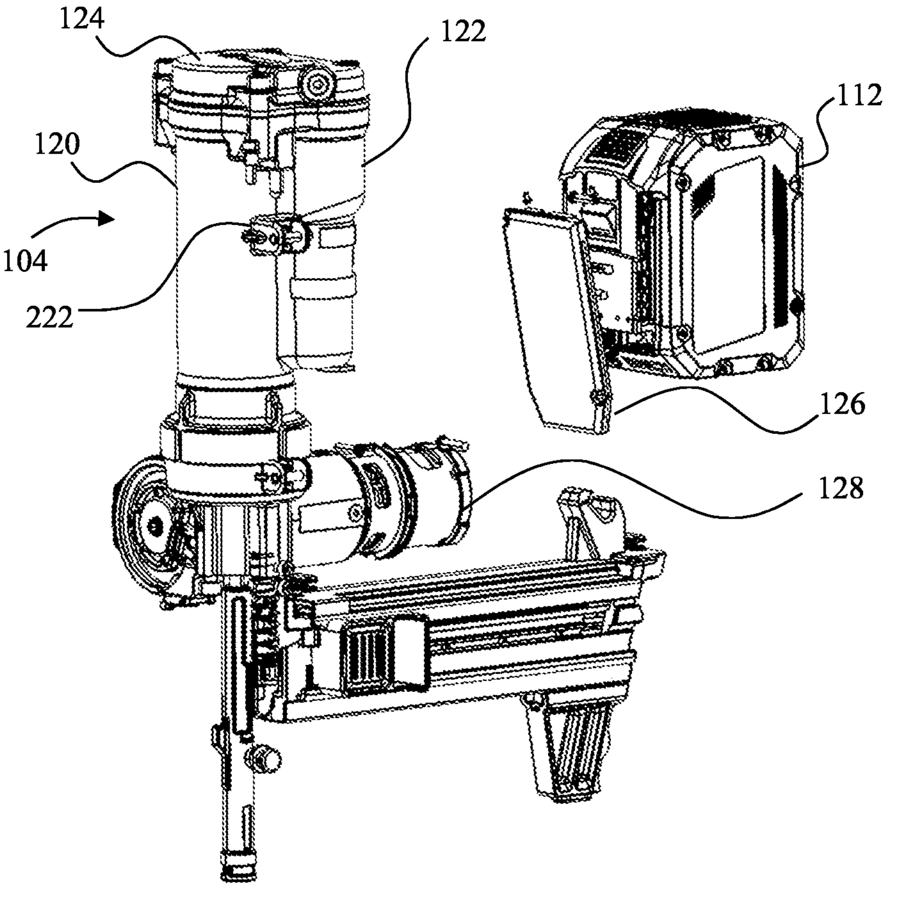
FIG. 2 depicts a perspective view of some components of the power tool of FIG. 1 with the housing removed.

As shown in FIG. 2, within the drive section 104 a cylinder 120 and accumulator 122 are provided. A cap 124 is used to seal the cylinder 120 and the accumulator 122 and defines a headspace 118 above the cylinder 120 and the accumulator 122 (see FIG. 3). A PCBA 126 is operably connected to the trigger 108, the battery 112, and a DC brushless motor 128.

Figure 3:
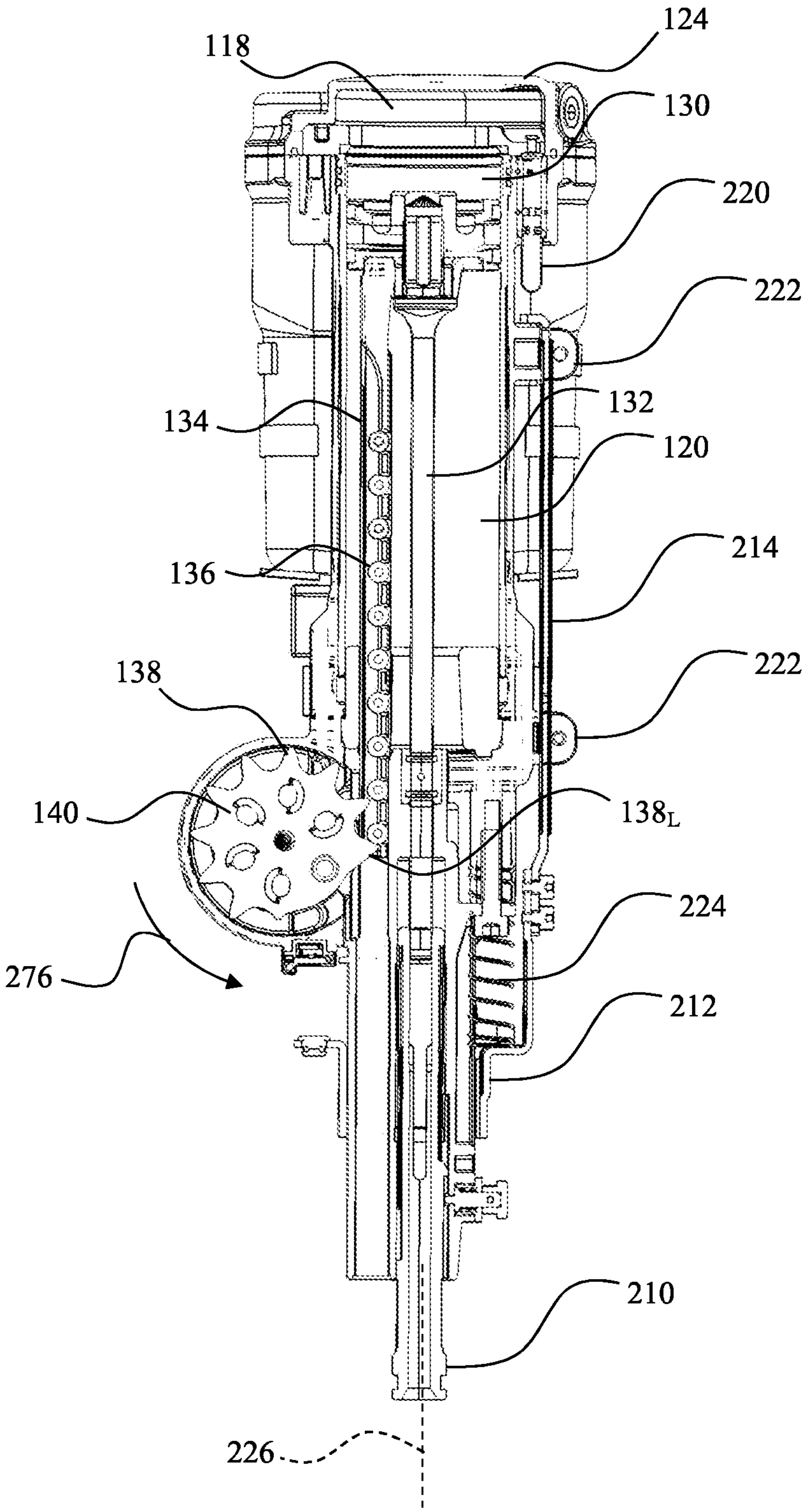
FIG. 3 depicts a front plan view in partial cross-section of an air spring, lifter gear, rack, driver and piston of the power tool of FIG. 1.

With reference to FIGS. 3-5, a piston 130 is provided within the cylinder 120. A driver 132 is fixedly attached to the piston 130 as is a rack 134. The rack 134 includes a number of rollers 136 which are configured to be engaged by teeth 138 of a lifter gear 140. As shown more clearly in the simplified depiction of FIG. 5, the lifter gear 140, which functions as a pinion gear, includes a toothed section 142 and a tooth gap section 144. The tooth gap section 144 is bounded by a first tooth $\mathbf{138}_F$ and a last tooth $\mathbf{138}_L$. The lifter gear 140 is operably connected to the motor 128 through a hub 146 (see FIG. 6) and a planetary gearbox 148 (see FIG. 4). Continuing with FIG. 6, the hub 146 is supported by a one-way needle bearing clutch 150.

Additional details regarding the structure of the lifter gear 140 and the hub 146 are provided with further reference to FIGS. 7-10. The hub 146 includes a geared motor side end portion 160 which is operably connected to the planetary gearbox 148. A body portion 162 is fixedly connected to an inner race of the one-way needle bearing clutch 150 which is not shown herein in further detail. The body portion 162 is oversized to provide for increased torque capacity with the one-way needle bearing clutch 150. A wheel portion 164 is positioned at the non-motor facing side of the hub 146. A central bore 166 extends inwardly from the wheel portion 164 into the body portion 162. The central bore is provided not only for coupling with the lifter gear as described below, but also to reduce the weight of the hub 146. A plurality of damper holders in the form of receptacles 168 are located about the periphery of the wheel portion 164. The receptacles 168 in this embodiment are closed on the motor facing side, but in other embodiments are at least partially open.

Additional damper holders in the form of bearing elements 170 are provided on the wheel portion 164 and extend in a direction away from the motor side toward the lifter gear 140. In some embodiments the hub is provided only with receptacles and in other embodiments the hub is provided only with bearing elements.

Figure 7:
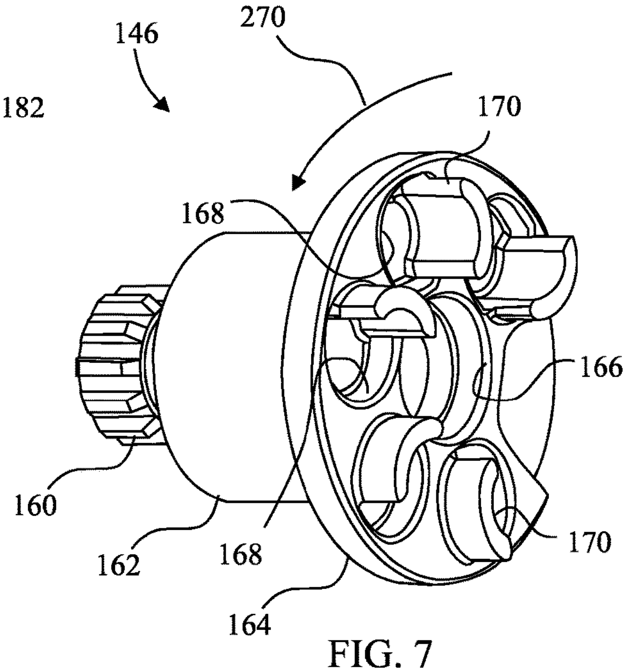
FIG. 7 depicts a side perspective view of the hub of FIG. 6.
Figure 8:
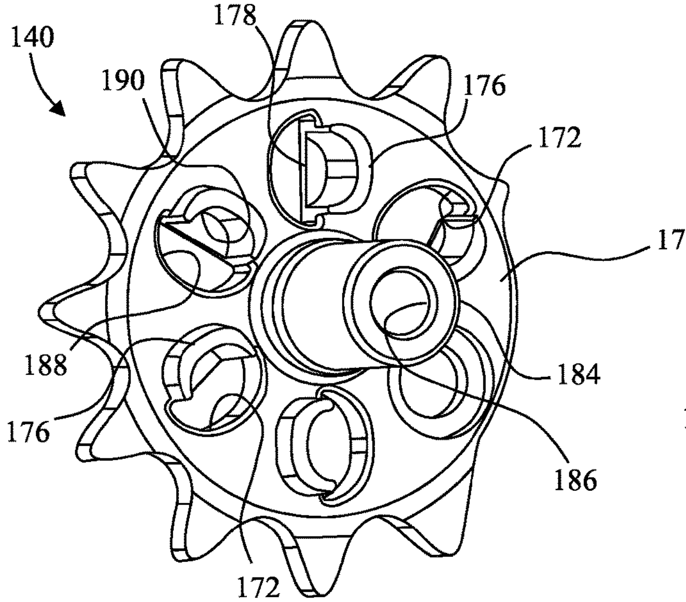
FIG. 8 depicts a rear perspective view of the lifter gear of FIG. 6
Figure 9:
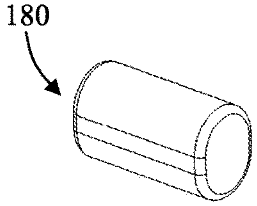
FIG. 9 depicts a perspective view of an elastomeric pad used in the power tool of FIG. 1 to pass torque from the hub to the lifter gear.

Within the wheel portion 164, the bearing elements 170 define one wall portion of the receptacles 168. The bearing elements 170 are sized to extend into damper holders 172 which are in the form of receptacles in a wheel portion 174 of the lifter gear 140. In the embodiment of FIGS. 7-8, the bearing elements 170 of the hub 146 are sized to extend completely through the wheel portion 174 of the lifter gear 140. In other embodiments, the bearing elements 170 are sized to terminate within the wheel portion 174.

The lifter gear 140 is also provided with damper holders in the form of bearing elements 176 which are sized to extend into the receptacles 168 of the hub 146. Bearing elements 176 in this embodiment extend both in the direction toward the hub 146 as well as in a direction away from the hub 146 and each bearing element 176 defines a portion of the wall of an associated receptacle 172. A lip 178 (see also FIG. 6) is provided on the non-motor facing side of the bearing elements 176. The hub 140 further includes a shaft 184 with an internal bore 186 which lightens the weight of the lifter gear 140.

In the embodiment of FIGS. 7 and 8, the receptacles 168 and 172 are similarly shaped and described with respect to a receptacle 172. As most clearly seen in FIG. 8, the receptacles 172 include a bearing element receiving portion 188 and a bearing element defined portion 190. The bearing element receiving portion 188 has an inner diameter which is selected to receive a bearing element 170 from the hub 146. The bearing element defined portion 190 has an inner diameter that is sized and shaped to be complimentary to an elastomeric damper 180. The bearing element defined portion 190 is thus a portion of the bearing element 176 within the wheel portion 174.

Figure 10:
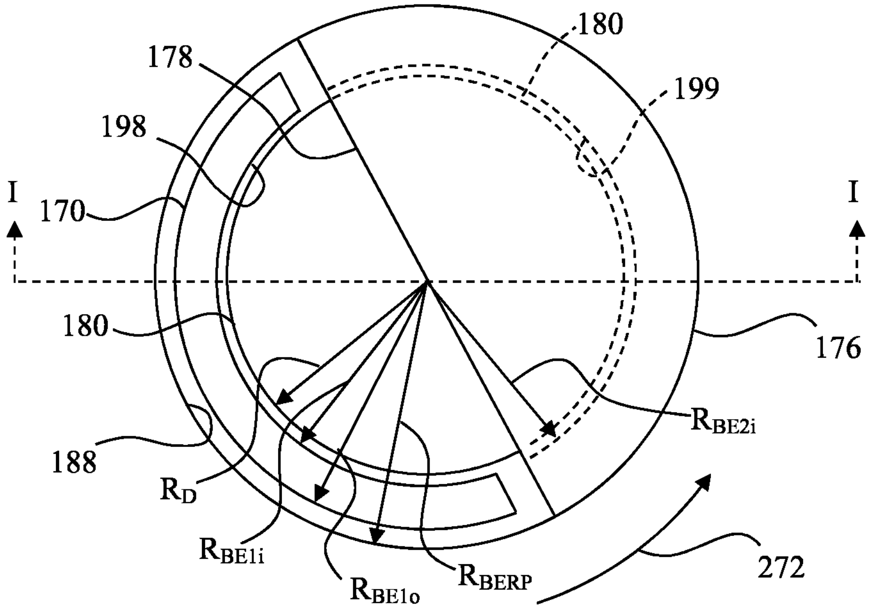
FIG. 10 is a simplified front plan view of one of the receptacles of the lifter gear of FIG. 6 with a bearing element of the hub extending through the receptacle and an elastomeric pad separating the bearing element from the lifter gear on one side of the bearing element.
Figure 11:
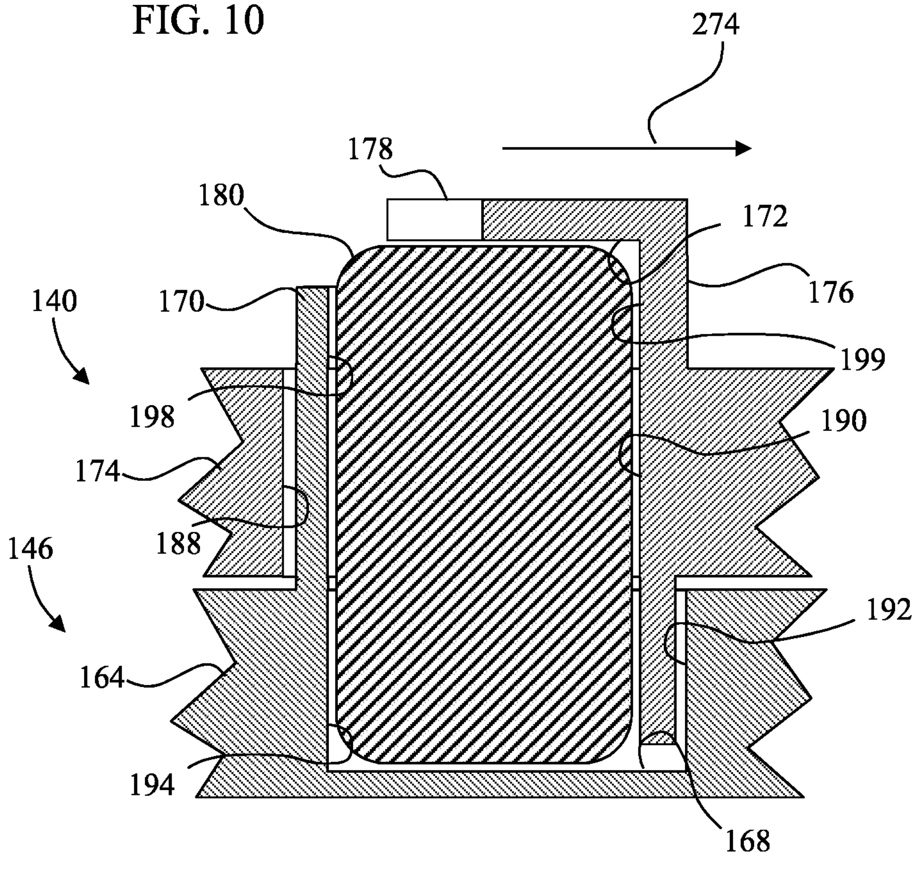
FIG. 11 is a simplified partial cross-sectional view of the hub, lifter gear, and elastomeric tab of the power tool of FIG. 1 taken along the line I-I of FIG. 10.

Elastomeric dampers 180 (see FIG. 9) are arranged in the damper holders 168/170/172/174 as described in detail with respect to FIGS. 10 and 11. Each elastomeric damper 180 extends from within a hub receptacle 168 to within a lifter gear receptacle 172. Within the receptacles 168 and the receptacles 172, the elastomeric dampers are located between the bearing elements 170/176 and the bearing element defined portion of the receptacles 168/172 (i.e., bearing element defined portion 190 for the receptacle 172 and bearing element defined portion 194 for the receptacle 168).

Accordingly, while the bearing elements 170 can contact the receptacles 172 along the bearing element receiving portion 188, the elastomeric dampers 180 preclude contact between the bearing element defined portion 190 and the bearing elements 170. Likewise, the bearing elements 176 can contact the receptacles 168 along the bearing element receiving portion 192, but the elastomeric dampers 180 preclude contact between the bearing element defined portion 194 and the bearing elements 176.

In the embodiment of FIG. 10, the elastomeric damper 180 has a substantially circular cross section with a maximum radius of curvature $R_D$. The various components are sized to provide for a tight fit when the unit is assembled which is described with reference to the components shown in FIG. 10. In FIG. 10, the bearing element 170 has an inner radius of curvature $R_{BE1i}$ which is substantially the same as an inner radius of curvature $R_{BE2i}$ of the bearing element 176. The radii of curvature $R_{BE1i}$ and $R_{BE2i}$ are selected to provide a friction fit with the elastomeric damper 180. The bearing element 170 has an outer radius of curvature $R_{BE1o}$ which is substantially the same as an inner radius of curvature $R_{BERP}$ of the bearing element receiving portion 188. Thus, when assembled the hub 146 and lifter gear 140 are tightly rotationally coupled.

The configuration of the hub 146, lifter gear 140, and elastomeric pads 180 provides for ease of assembly. In particular, the elastomeric pads can be loaded into the receptacles 168, the receptacles 172, or a combination of receptacles 168 and 172 as desired. The shaft 184 is then aligned with the central bore 166, and inserted into (or received by) the central bore 166. As the shaft 184 is positioned within the bore 166, the bearing elements 170 are positioned in the receptacles 172 and the bearing elements 176 are positioned in the receptacles 168. The elastomeric pads are likewise positioned within the receptacles 172, the receptacles 168, or a combination of receptacles 168 and 172 into which they were not previously loaded. The lips 178 and the blind bore receptacles 168 (or optionally lips in some embodiments) maintain the elastomeric pads 180 within the hub 146 and lifter gear 140 during the assembly. The bolt 182 is then used to secure the assembly with the elastomeric pads 180 precluding contact between the inner wall portions 198 and the inner wall portions 199.

Figure 6:
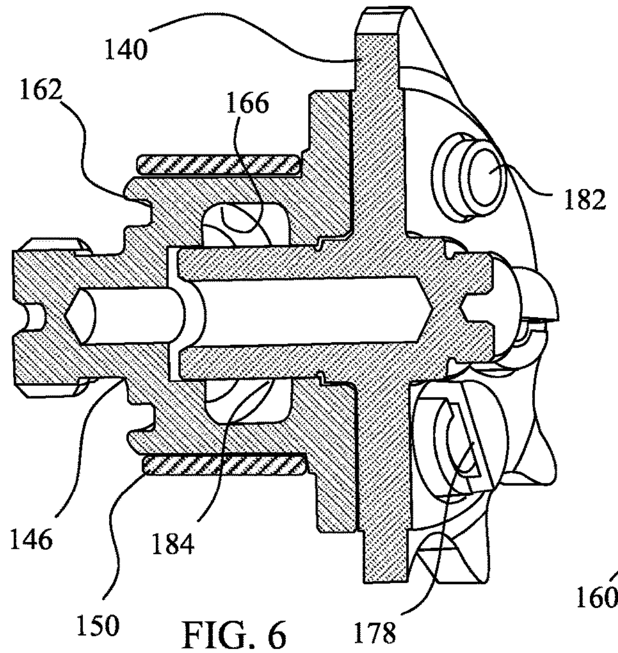
FIG. 6 depicts a side cross-sectional view of the hub and lifter gear of the power tool of FIG. 1.

Continuing with FIG. 6, as noted above, the bolt 182 secures the lifter gear 140 to the hub 146. Consequently, the shaft 184 of the lifter gear 140 is maintained within the central bore 166 thereby aligning the hub 146 and the lifter gear 140 while entrapping the elastomeric dampers 180 between the hub 146 and the lips 178.

While one variation of the hub/lifter gear/damper arrangement has been depicted, a variety of modifications are available. Thus, in some embodiments, one of the hub and the lifter gear includes damper holders only in the form of receptacles and the other of the hub and the lifter gear includes damper holders only in the form of bearing elements. In some embodiments neither bearing elements of the hub nor bearing elements of the lifter gear extend beyond the receptacles into which they are inserted. In some embodiments, both the bearing elements of the hub and the bearing elements of the lifter gear extend beyond the receptacles into which they are inserted. In some embodiments, bearing elements are provided which define a bearing element defined portion of a receptacle and do not extend outwardly of the receptacle.

Figure 12:
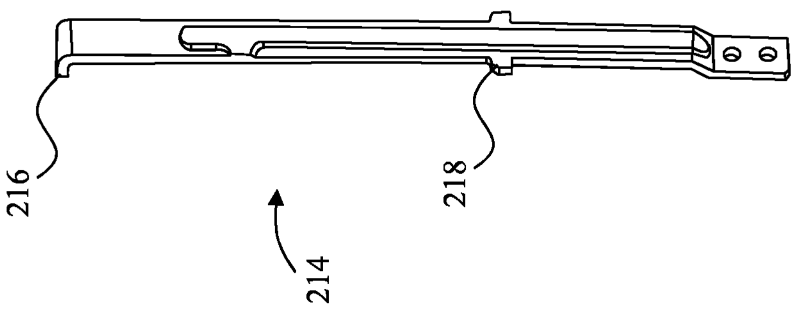
FIG. 12 is a perspective view of the WCE extension of FIG. 3.

Returning to FIG. 3, the WCE assembly 116 includes a nose piece 210, which in this embodiment is the WCE, that is fixedly attached to a WCE stamping 212. A WCE extension 214, also shown in FIG. 12, is attached to the WCE stamping 212 at one end and at the other end includes a bearing portion 216. The WCE extension 214 further includes shoulders 218. The WCE extension 214 is maintained in alignment with a plunger 220 by a pair of guides 222 (also shown in FIG. 2). A WCE spring 224 biases the WCE stamping 212 along a work or drive axis 226 in a direction away from the WCE extension 214. The shoulders 218 of the WCE extension 214 act as stops with the lower of the two guides 222 to limit downward travel of the nose piece/WCE 210, WCE stamping 212, and WCE extension 214.

As used, herein, "downward" refers to the direction in which a nail (not shown) is driven by the nailer 100 along the drive axis 226, which is in the downward direction in the configuration depicted in FIG. 3. Additionally, for ease of discussion, "movement" of the various components is described herein with reference to the housing 102 of the nailer. In particular, under normal operating conditions the WCE 210, the WCE stamping 212, and the WCE extension 214 do not actually move since the WCE 210 is positioned against a work piece. Rather the rest of the nailer 100 is moved to compress the WCE spring 224. Nonetheless, the WCE 210, the WCE stamping 212, and the WCE extension 214, along with other components, will be described as "moving" for ease of discussion, it being understood that the "movement" simply refers to movement relative to the housing 102.

Figure 14:
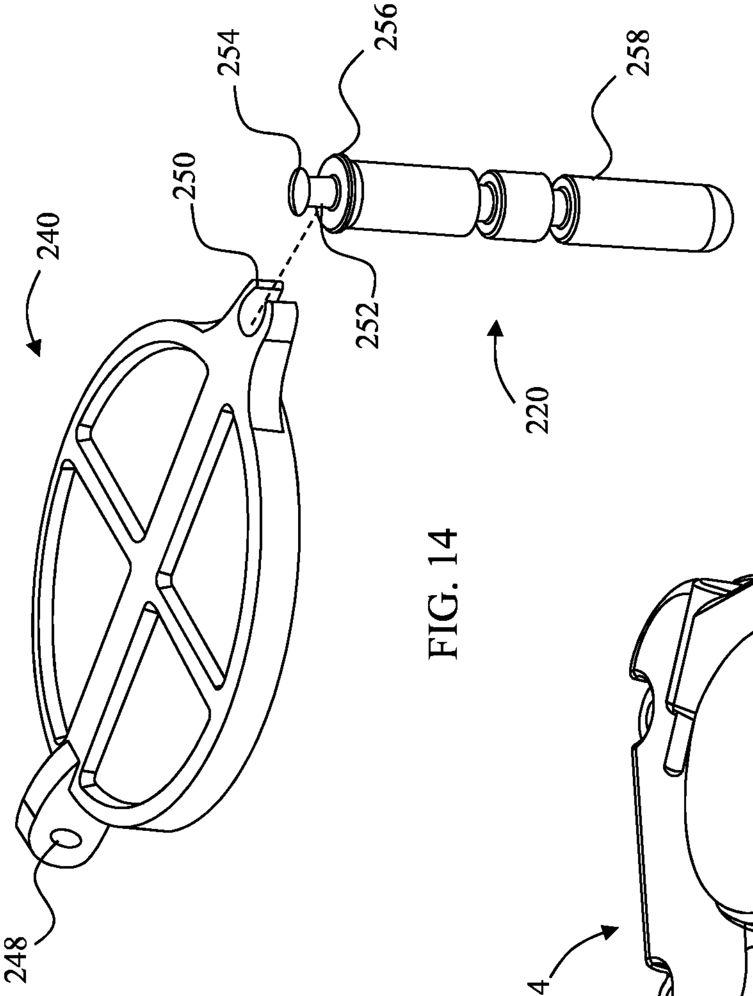
FIG. 14 is a perspective view of the flapper valve and plunger of the nailer of FIG. 1.
Figure 13:
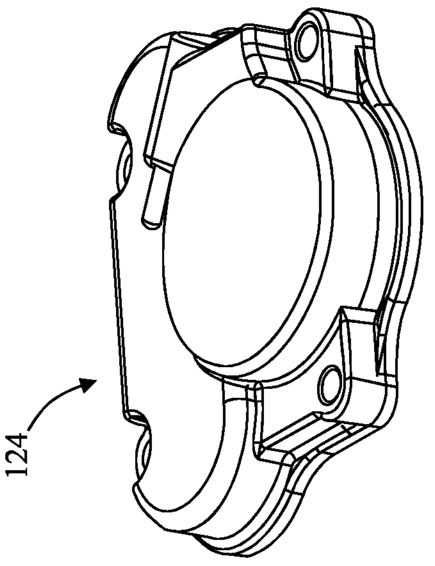
FIG. 13 is a perspective view of the cap of FIG. 3.
Figure 15:
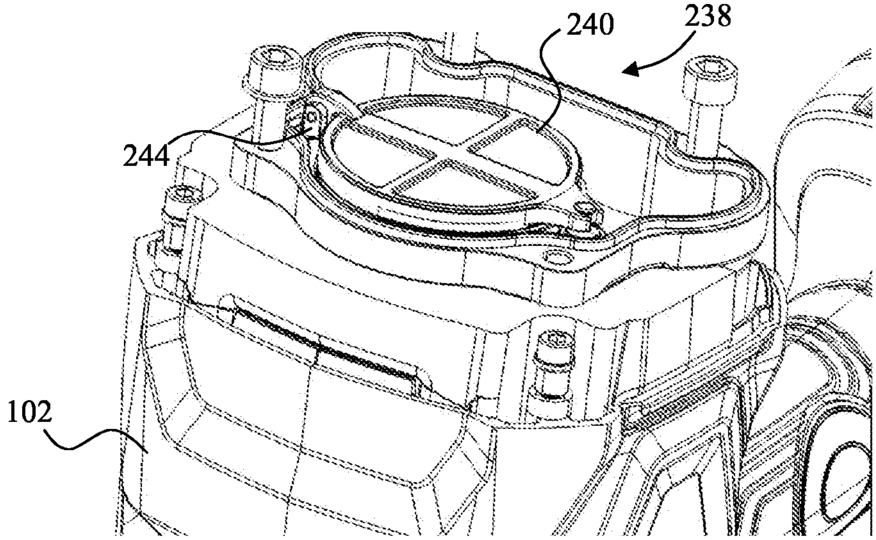
FIG. 15 is a partial perspective view of the nailer of FIG. 1 with a portion of the housing and the cap removed to show the location of the head valve assembly
Figure 16:
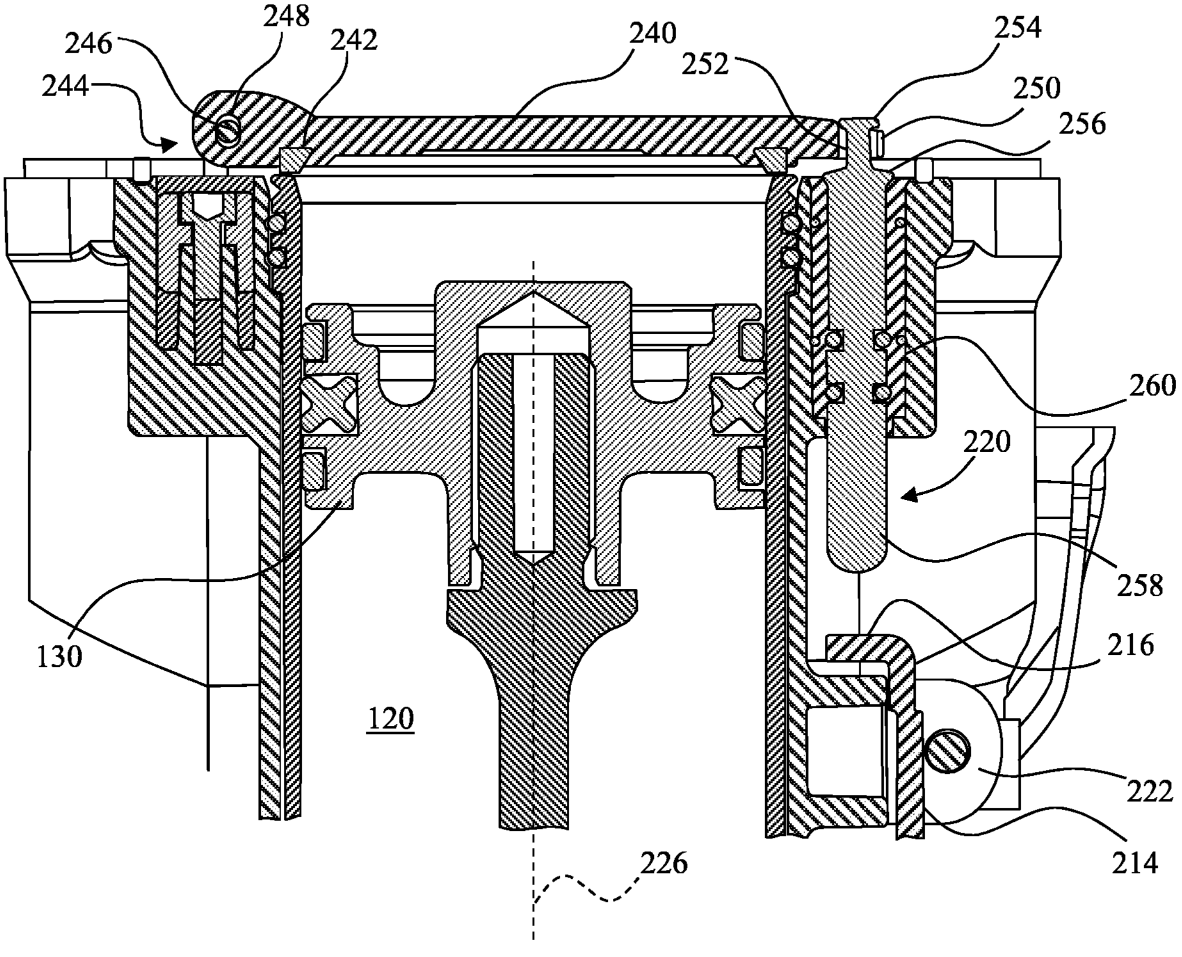
FIG. 16 is a partial cross sectional view of the head valve assembly and air cylinder of the nailer of FIG. 1 with the flapper valve in a non-firing position.

Returning to FIG. 1, a portion of the housing 102 is removed as is the cap 124 (see FIGS. 2 and 13) to reveal a head valve assembly 238 which is also shown in FIGS. 14-16. The head valve assembly 238 includes a flapper valve 240 which has a seal 242, the plunger 220, and a pivot 244. The pivot 244 includes a circular pin 246 that fits within an oval pivot bore 248 of the flapper valve 240. The flapper valve 240, which can seal the headspace 118, and thus the accumulator 122, from the cylinder 120, includes a pair of fingers 250 that receive a neck portion 252 of the plunger 220.

The neck portion 252 is located between a head 254 and shoulder 256 of the plunger 220. The neck portion 252 is configured to slide between the fingers 250 from the side (i.e., in a direction orthogonal to the drive axis 226), while the head 254 and the shoulder 256 are sized to not pass through the fingers 250 in directions along the drive axis 226. In some embodiments the neck portion is circular in cross section. In other embodiments the neck portion is configured to allow insertion into the fingers in one orientation, while preventing insertion (or removal) when rotated to a different orientation.

A shaft portion 258 of the plunger 220 extends outwardly of the headspace 118 in an airtight but slidable manner through an insert 260. The shoulder 256 of the plunger 220 is configured to abut the insert 260, which is fixedly positioned in the nailer 100, in a non-firing configuration as depicted in FIG. 16.

Operation of the nailer 100 is described with initial reference to FIG. 16. In the configuration of FIG. 16, the piston 130 is at is full upward position within the air cylinder 120, and is held at this position by the last tooth $\mathbf{138}_L$ of the lifter gear 140 (see FIG. 5). In this configuration the air within the upper portion of the air cylinder 120, the headspace 118, and the air accumulator 122 is fully pressurized. The pressure differential between the headspace 118 and atmosphere acts across the plunger 220 biasing the plunger 220 downwardly along the drive axis 226 thereby forcing the shoulder 256 of the plunger 220 against the insert 260.

Because the head 254 of the plunger is larger than the opening defined by the fingers 250 of the flapper valve 240 (in a plane orthogonal to the drive axis 226), the flapper valve 240 is maintained in a non-firing position, and hence the seal 242, is held firmly against the upper portion of the air cylinder 120 thus sealing the air cylinder 120 from the headspace 118. In some embodiments, the pivot bore 248 is circular, which creates a tight seal around the entire circumference of the seal 242. In the embodiment of FIG. 16, the pivot bore 248 is oval with the major axis extending along the drive axis 226, and positioned to have the pin 246 centrally located when the shoulder 256 is resting against the insert 260. Consequently, the force of the seal 242 against the air cylinder 120 is reduced at locations proximate the pivot 244. The reduced force reduces frictional forces introduced between the seal 242 and the air cylinder 120 which must be overcome when actuating the WCE assembly, allowing the WCE actuating force (described below) to be dominated by forces from the WCE spring 224 and forces resulting from the pressurized air in the headspace acting against the plunger 220 as discussed in further detail below.

The reduced force of the seal 242 against the air cylinder 120 may result in some initial leakage past the seal 242 in the event the air in the headspace 118 is at a higher pressure than the air in the air cylinder 120, but such leakage does not significantly affect the safety performance of the head valve assembly 238. In particular, in the event the piston 130 is inadvertently released from the last tooth $138_L$, for example, due to a mechanical or electrical fault, the compressed air in the volume of the air cylinder 120 above the piston 130 will force the piston 130 to begin to move downwardly. The area in the air cylinder 120 above the piston thus depressurizes rapidly.

The pressure in the headspace 118 does not, however, depressurize as rapidly (if at all) since the flapper valve 240 is in a non-firing position which hinders passage of air from the headspace 118 to the air cylinder 120. Thus, the pressure differential across the flapper valve 240 quickly fully seals the flapper valve 240 even if some leakage initially occurs. Thus, the air in the headspace 118, and the air in the air accumulator 122 is not allowed to pass freely into the air cylinder 120. Accordingly, the piston 130 is driven with a substantially lesser force than during normal operation. This safety feature is provided by flapper valves which are initially tightly seated, flapper valves which are initially not tightly seated, and flapper valves which allow some leakage even when tightly seated. In all instances, because the passage of air into the air cylinder is obstructed, the force applied to a fastener is substantially reduced in the event of an inadvertent firing of the nailer 100.

Continuing with the description of normal operation of the nailer 100, with the piston and flapper valve in the configuration of FIG. 16, a user presses the WCE/nosepiece 210 (see FIG. 3) against a workpiece (not shown) thereby compressing the WCE spring 224 as the WCE stamping 212 and WCE extension 214 move upwardly, with respect to the housing 102, along the drive axis 226. This movement continues until the bearing portion 216 of the WCE extension 214 contacts the lower end of the shaft 258 of the plunger 220. At this point, additional force must be applied to provide continued upward movement of the WCE 210, WCE stamping 212, WCE extension 214, and plunger 220.

Specifically, the force required to move the WCE 210 is referred to as the "WCE actuation force". The WCE actuation force is a design choice which takes into account the weight of the tool and provides a safety factor to ensure the operator is actively pressing the WCE against a workpiece to prevent inadvertent firing of the nailer. In some instances the WCE actuation force is desired to be the amount of force provided by the tool (the weight of the tool at the nose of the tool) plus about 50% of the total weight of the tool. Thus, for a power tool of 10 pounds with an even weight distribution between the nose and the rear of the tool, the force provided by the tool is about 5 pounds force and the additional 50% requires another 5 pounds force for a total of 10 pounds force.

With respect to the nailer 100, the WCE actuation force is initially established primarily by the counter force of the WCE spring 224 with some negligible friction forces, and is thus a function of the spring constant of the WCE spring 224. Thus, the WCE actuation force is initially simply the force needed to overcome the WCE counter-force of the WCE spring 224. Once the bearing portion 216 contacts the plunger 220, however, the force of the pressurized air in the headspace 118 against the plunger 220 must also be overcome. This force is a function of the pressure in the headspace 118 along with the diameter of the plunger. By forming the pivot bore 248 as an oval as described above, frictional forces associated with the seal 242 and air cylinder 120 are significantly reduced. Moreover, because the frictional forces between the seal 24 and the air cylinder 120 are significantly reduced, moving the flapper valve 240 does not introduce significant torque on the plunger 220, thereby minimizing friction associated with movement of the plunger 220.

Therefore, since the pressure in the head valve is a design parameter which is determined based upon the force needed to drive the fastener, the main determinants of the actuation counter-force are the spring constant of the WCE spring 224 and the diameter of the of the plunger 220.

Thus, the WCE spring 224 spring constant and the diameter of the plunger 220 can be selected to provide a desired WCE actuation force profile. In one embodiment, the spring constant and the plunger diameter are selected such that the WCE spring 224 and movement of the plunger 220 each account for about 50% of the actuation counterforce as the flapper valve 240 moves into a firing position. In other embodiments, different actuation counter-force profiles are provided.

Figure 17:
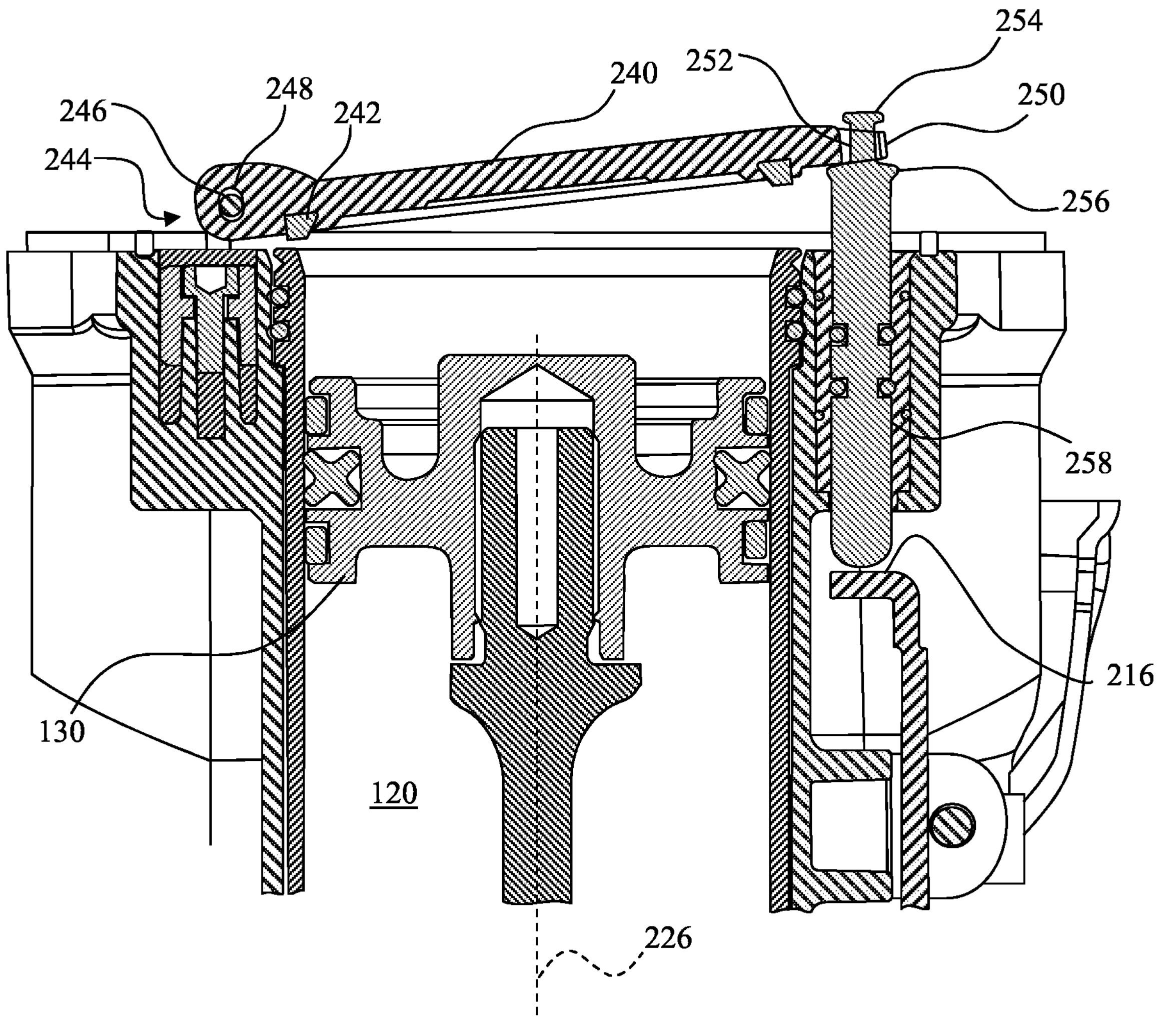
FIG. 17 is a partial cross sectional view of the head valve assembly and air cylinder of the nailer of FIG. 1 with the flapper valve in a firing position.

Continued application of the WCE actuation force moves the plunger 220 to a firing position as depicted in FIG. 17. In the configuration of FIG. 17, a continuous air path is provided between the air accumulator 122 and the air cylinder 120 through the headspace 118. As shown in FIG. 17, the opening defined by the fingers 250 is larger than the diameter of the neck portion 252, allowing the flapper valve 240 to pivot about the pivot pin 246 without torqueing the plunger 220 and/or creating significant friction.

A sensor (not shown, typically a Hall sensor) senses the position of the WCE 210, either directly or indirectly, such as by sensing the WCE stamping 212 or the WCE extension 214, and sends a signal to the PCBA 126 indicating that the WCE 210 has been depressed sufficiently to allow for firing of the nailer 100. A signal indicating depression of the trigger is also sent to the PCBA 126. With the flapper valve in the firing position and the trigger depressed, the PCBA 126 "fires" the nailer by energizing the motor 128 thereby rotating the hub 146 in the direction of the arrow 270 in FIG. 7. The rotation indicated by the arrow 270 in FIG. 7 corresponds to rotation in the direction of the arrows 272 and 274 in FIGS. 10-11.

As evidenced by FIGS. 10 and 11, as the hub 146 rotates, the inner wall 198 which is defined by the bearing element 170, and which extends from the bearing element defined portion 194 into a bearing element receiving portion 188 of the receptacle 172, is forced against the elastomeric pad 180 and thus the elastomeric pad 180 is forced against the inner wall 199 which is defined by the bearing element 176, and which extends from above (as depicted in FIG. 11) the bearing element defined portion 190, through the bearing element defined portion 190, and into the bearing element receiving portion 192 of the receptacle 168. The motor 128 thus causes the lifter gear 140 to rotate. There is, however, no direct transfer of torque from the hub 146 to the lifter gear 140.

Returning to FIG. 3, as the lifter gear 140 rotates in the direction of the arrow 276, the last tooth $138_L$ is forced out of engagement with the bottom roller 136 in the rack 134 allowing compressed air entrapped in the cylinder 120 above the piston 130, as well as compressed air in the headspace 118 and accumulator 122, to expand thereby forcing the piston 130 along the drive axis 226. The driver 132 is then forced against a nail (not shown) forcing the nail into a workpiece (not shown).

Figure 18:
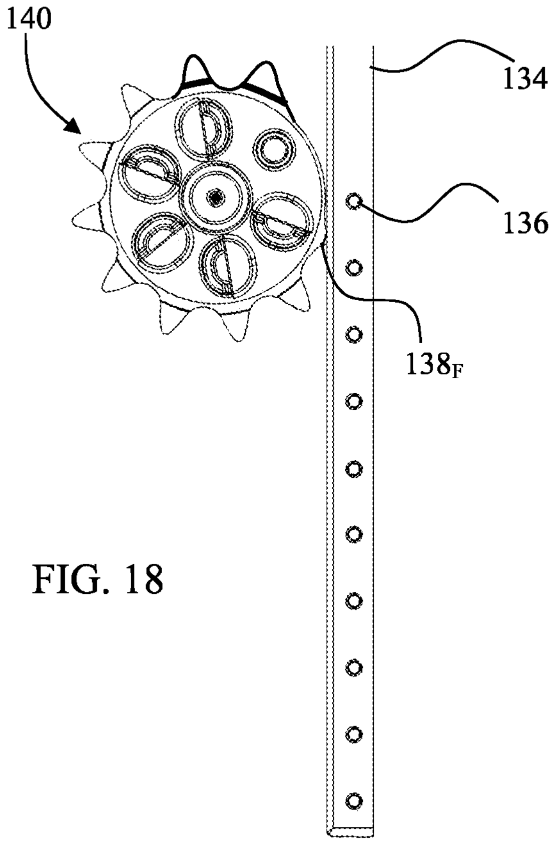
FIG. 18 is a partial front plan view of the lifter gear and rack of the power tool of FIG. 1 with the first tooth of the lifter gear engaged with the top roller of the rack.

Once the driver 132 has been fully extended, the motor 128 will have rotated the lifter gear 140 so that the first tooth $138_F$ is positioned to engage the first (top) roller as shown in FIG. 18. Continued rotation of the motor 120 results in continued rotation of the lifter gear 140 resulting in the piston 130, and hence the driver 132, being lifted to the ready position shown in FIG. 3 by time the motor 120 effects one complete rotation of the lifter gear 140.

Figure 19:
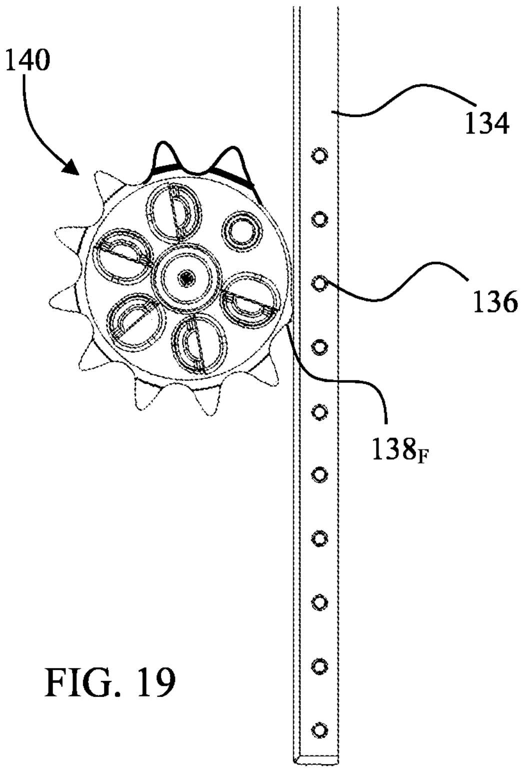
FIG. 19 is a partial front plan view of the lifter gear and rack of the power tool of FIG. 1 with the first tooth of the lifter gear engaged with the third roller of the rack.

In the event the driver 132 does not fully extend, resulting in the configuration of FIG. 19, then the first tooth 138$_F$ will engage a roller 136 other than the first (top) roller 136. In FIG. 19, the first tooth 138$_F$ is shown engaging the third roller 136. Continued rotation of the motor 120 in this scenario results in continued rotation of the lifter gear 140 resulting in the piston 130, and hence the driver 132, being lifted to the ready position before the motor 120 effects one complete rotation of the lifter gear 140. Consequently, jam shock will occur as the motor 120 continues rotating the lifter gear 140 with the piston 130 at the ready position shown in FIG. 3.

In particular, as the motor 128 continues rotating the lifter gear 140 with the piston 130 at the ready position, the teeth 138 are forced out of engagement with the rack 134. The flapper valve 240 will still be in the firing position, accordingly, the air in the accumulator 122 is not yet isolated from the air in the cylinder 120. Thus, the compressed air in the cylinder 120, the headspace 118, and the accumulator 122 will force the piston 130, and hence the rack 134, along the drive axis 226 as a following tooth 138 rotates into the path of a roller 136 of the rack 134.

A portion of the force of the impact of the engagement of the tooth 138 with a roller 136 of the moving rack 134 is transferred to the bearing elements 176 of the lifter gear 140 and transferred to the elastomeric pads 180 through the contacting portions of the bearing elements 176 and the elastomeric pads 180. The elastomeric pads 180 thus absorb at least a portion of the force of the impact.

In some embodiments, some of the force of the impact is further transferred from the elastomeric pads 180 to the bearing elements 170 of the hub 146. Any such force is precluded from reversing the rotation of the hub 146, however, by the one-way needle bearing clutch 150. Thus, the planetary gearbox 148 is protected from the jam shock.

In any event, once the last tooth 138$_L$ has engaged the lowest roller, rotation of the motor 128 is stopped. Upon lifting the nailer 100 off of the workpiece, the WCE spring 224 forces the WCE 210, the WCE stamping 212, and the WCE extension 214 downwardly along the drive axis 226 until the shoulders 218 of the WCE extension 214 contact the lower guide 222.

The downward movement of the WCE extension 214 allows the compressed air within the headspace 118 to force the plunger 220 outwardly from the headspace 118 in a downward direction along the drive axis 226. The plunger 220 continues to move along the drive axis 226 until the shoulder 256 once again contacts the insert 260. As the plunger 220 moves downwardly, the head 254 contacts the fingers 250 and forces the flapper valve 240 to move from the firing position of FIG. 17 to the non-firing position of FIG. 16. The nailer 100 is thus configured for a subsequent firing operation.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

We claim:

1. A power tool, comprising:
- an air spring cylinder;
- a piston located within the air spring cylinder;
- an air accumulator; and
- a head valve assembly including a flapper valve configured to seal the air spring cylinder from the air accumulator when the flapper valve is in a non-firing position.

2. The power tool of claim 1, further comprising:
- a cap defining a headspace configured to fluidically connect the air accumulator and the air spring cylinder, wherein
- the flapper valve is configured to seal the air spring cylinder from the headspace in the non-firing position.

3. The power tool of claim 2, wherein the head valve assembly further comprises:
- a pivot including a pivot pin received within a pivot bore of the flapper valve, wherein the flapper valve is movable with respect to the pivot pin.

4. The power tool of claim 3, wherein:
- the air spring cylinder defines a drive axis;
- the pivot pin has a circular cross section;
- the pivot bore has an oval cross section; and
- a major axis of the pivot bore extends along the drive axis.

5. The power tool of claim 3, wherein the head valve assembly further comprises:
- a plunger operably coupled with the flapper valve and configured to move the flapper valve from the non-firing position to a firing position.

6. The power tool of claim 5, wherein the plunger is further configured to move the flapper valve from the firing position to the non-firing position.

7. The power tool of claim 6, wherein:
- the air spring cylinder defines a drive axis extending upwardly and downwardly;
- the plunger includes a neck positioned between fingers of the flapper valve;
- the plunger is configured to move the flapper valve from the non-firing position to the firing position using a first shoulder portion of the plunger located beneath the fingers; and
- the plunger is configured to move the flapper valve from the firing position to the non-firing position using a head of the plunger located above the fingers.

8. The power tool of claim 5, further comprising:
- a work contact element (WCE) assembly including a bearing portion aligned with a shaft of the plunger, the WCE assembly configured to move the plunger upwardly along a drive axis defined by the air spring cylinder when the power tool is pressed downwardly with the WCE assembly in contact with a workpiece.

9. The power tool of claim 8, the WCE assembly further comprising a WCE spring configured to bias the WCE bearing portion downwardly along the drive axis, wherein:
- the WCE spring has a spring constant selected to provide about 50% of a WCE actuation counter-force when the flapper valve is at the firing position; and
- the plunger is configured to provide about 50% of the WCE actuation counter-force when the flapper valve is at the firing position.

10. A method of operating a power tool, comprising:
- moving a flapper valve, of a head valve assembly, configured to seal an air spring cylinder from an air accumulator when the flapper valve is in a non-firing position, to a firing position;
- disengaging a lifter gear from a rack fixedly attached to a piston positioned in the air spring cylinder; and
- moving the piston within the air spring cylinder upon disengagement of the lifter gear from the rack using compressed air from the air accumulator thereby driving a fastener with a driver blade fixedly attached to the piston.

11. The method of claim 10, wherein moving the flapper valve further comprises:

moving the flapper valve into a headspace defined by a cap, the headspace configured to fluidically connect the air accumulator and the air spring cylinder.

12. The method of claim 11, wherein the flapper valve is configured to seal the air spring cylinder from the headspace in the non-firing position.

13. The method of claim 11, wherein moving the flapper valve further comprises:

pivoting the flapper valve using a pivot including a pivot pin received within a pivot bore of the flapper valve.

14. The method of claim 13, wherein:

the air spring cylinder defines a drive axis;

the pivot pin has a circular cross section;

the pivot bore has an oval cross section;

a major axis of the pivot bore extends along the drive axis; and pivoting the flapper valve comprises pivoting the pivot bore with the oval cross section about the pivot pin.

15. The method of claim 13, further comprising:

moving the flapper valve to the firing position using a plunger operably coupled with the flapper valve.

16. The method of claim 15, further comprising:

moving the flapper valve from the firing position to a non-firing position using the plunger after moving the piston within the air spring cylinder.

17. The method of claim 16, wherein:

the air spring cylinder defines a drive axis extending upwardly and downwardly;

the plunger includes a neck positioned between fingers of the flapper valve;

moving the flapper valve to the firing position comprises moving the flapper valve to the firing position using a first shoulder portion of the plunger located beneath the fingers; and moving the flapper valve from the firing position to the non-firing position comprises moving the flapper valve from the firing position to the non-firing position using a head of the plunger located above the fingers.

18. The method of claim 15, further comprising:

pressing the power tool downwardly along a drive axis, defined by the air spring cylinder, while a work contact element (WCE) assembly is in contact with a workpiece; and moving the plunger upwardly along the drive axis with a bearing portion of the WCE assembly contacting a shaft of the plunger to move the flapper valve to the firing position.

19. The method of claim 18, further comprising:

providing about 50% of a WCE actuation counter-force when the flapper valve is at the firing position with a WCE spring of the WCE assembly, the WCE spring configured to bias the WCE assembly downwardly along the drive axis; and providing about 50% of the WCE actuation counter-force when the flapper valve is at the firing position with the plunger.

20. The power tool of claim 1 wherein:

the head valve assembly further comprises a pivot including a pivot pin defining a pivot axis;

the air spring cylinder defines a drive axis; and the pivot axis is not parallel to the drive axis.

* * * * *